United States Patent [19]

Reintjes et al.

[11] Patent Number: 4,883,390

[45] Date of Patent: Nov. 28, 1989

[54] METHOD AND APPARATUS FOR EFFECTING PNEUMATIC CONVEYANCE OF PARTICULATE SOLIDS

[75] Inventors: Harold Reintjes, Short Hills; Sam Lampert, Upper Montclair, both of N.J.

[73] Assignee: Petrocarb, Inc., Charlotte, N.C.

[21] Appl. No.: 408,634

[22] Filed: Aug. 16, 1982

[51] Int. Cl.⁴ .................. B65G 53/66; B65G 53/36; B65G 53/38

[52] U.S. Cl. .................................. 406/24; 406/32; 406/124; 406/137

[58] Field of Search .................. 406/123–126, 406/24, 25, 32, 137

[56] References Cited

U.S. PATENT DOCUMENTS

| | | | |
|---|---|---|---|
| 3,230,016 | 1/1966 | Gilbert et al. | 406/124 |
| 3,689,045 | 9/1972 | Coulter et al. | 406/24 X |
| 4,482,275 | 11/1984 | Shinozaki et al. | 406/124 X |
| 4,529,336 | 7/1985 | Shinozaki et al. | 406/124 X |
| 4,582,454 | 4/1986 | Brandenburg et al. | 406/24 X |
| 4,758,117 | 7/1988 | Maki et al. | 406/24 X |
| 4,758,118 | 7/1988 | Rachner et al. | 406/123 X |

FOREIGN PATENT DOCUMENTS 958136   5/1964   United Kingdom ............... 406/137

Primary Examiner—Joseph F. Peters Jr.
Assistant Examiner—James M. Kannofsky
Attorney, Agent, or Firm—Ralph H. Dougherty

[57] ABSTRACT

This invention relates to a method and apparatus for delivering particulate solids in a stream of gas to a selected delivery point. The particulate solids are entrained in a stream of gas, and controls set the desired delivery weight rate for delivery of the solids to the delivery point. The weight of the container, which encloses the entraining system and the solids, is determined continuously.

6 Claims, 4 Drawing Sheets

METHOD AND APPARATUS FOR EFFECTING PNEUMATIC CONVEYANCE OF PARTICULATE SOLIDS

This invention relates to an improved process and system for effecting pneumatic conveyance of solids, and has for its particular object to provide an improved process and apparatus for effecting the pneumatic transport of solids at consistent and controlled rates and high solids to gas ratios.

Prior art U.S. Pat. No. 3,230,016 dated Jan. 18, 1966 describes a novel and successfully used method of feeding solids. However, that process and apparatus have limitations for some applications which have been overcome by the present invention and thus broaden its commercial importance and potential acceptance. The invention described herein resides in an improved process for effecting continuous, non-cyclic conveyance of particulate or powdered solids, in a completely automatic mode, whereby it is possible for the user to program the feed rate of a single or multiple streams of solids into a process operating at any desired pressure from super-atmospheric to sub-atmospheric levels and to measure and record the amount of solids being fed and transported.

Prior art systems are available for feeding solids continuously but these systems utilize a multiplicity of vessels, the feed from which is cyclically interrupted, and/or mechanically rotated parts such as rotary valves which are subject to wear and leakage and are not well adapted to high pressure applications particularly where multiple streams are required such as when feeding pulverized coal to a blast furnace having typically as many as twelve (12) to forty (40) tuyeres.

The process and equipment described in this invention are particularly useful for the feeding of particulate or pulverized coal to the tuyeres of a blast furnace for the replacement of expensive liquid or gaseous hydrocarbons currently used as auxiliary blast furnace fuel, or in those blast furnaces that do not employ auxiliary fuel injection this invention permits the substitution of 10% to 30% of the expensive burden coke which is less expensive coal. In some blast furnace operations it is desired to adjust the amount of injected fuel in one or more tuyeres in proportion to the change in blast air for those particular tuyeres. In these applications the proportionality signal from the flow in each tuyere can be utilized to adjust the flow of coal by the unique characteristics of the process of this invention. In some prior art feeding systems it was a desired characteristic to maintain a constant ratio between the coal fed and the accompanying gas. In the application of the subject invention to blast furnace operation it is unnecessary and undesirable to maintain the solids/conveying gas ratio constant since the feeding system employs a high solids:gas ratio in any event and the amount of conveying gas is therefore relatively unimportant in proportion to the normal amount of blast air. The maintenance of a fixed solids:gas ratio is undesirable because it is a needless instrumentation expense and it removes flexibility of other control functions.

A similar use of this invention is for the feeding of finely ground coke breeze or coal to the tuyeres of iron melting cupolas to provide operating economies and greater operational flexibility.

By means of a novel logic and electronic signal system the weight of material in the injector vessels is transformed to a feed rate measuring and control system which is unique primarily because the rate of flow from the Primary Injector is being measured and controlled substantially continuously even during the period when a batch of material is being transferred from the Storage Injector to the Primary Injector to replenish the portion of material fed over a period of time. A further optional but desirable feature of the invention is the use of a special pressure balanced expansion joint between the Storage Injector and Primary Injector which because of its pressure compensating feature exerts a very low thrust load on the vessels due to the pressure therein, thus permitting very accurate weight measurements by the load cell systems provided with the injector vessels.

Accordingly, an important aspect of the invention resides in an improved process for effecting pneumatic conveyance of particulate solid materials comprising introducing a gas into the lower portion of a mass of such material maintained in a container, hereinafter referred to as a Primary Injector vessel, under positive pressure thereby "fluffing" but not fluidizing the material, flowing said material admixed with gas downwardly from the Primary Injector vessel through one or more annular passages into one or more connecting conduits, introducing additional gas into said conduit, or each of said conduits, upstream from behind the point of introduction of said solids-gas mixture thereinto and conducting said solids to ultimate use, providing a second container, hereinafter referred to as the Storage Injector, or storage vessel which is isolated from the Primary Injector by cyclically controlled valves, located immediately above said Primary Injector and which performs the function of a lockhopper, or optionally located in the same or different level from the Primary Injector but interconnected by transport pipe and valves in which case the container is referred to as a Feed Injector. The purpose of the Storage Injector or Feed Injector is to automatically refill the Primary Injector on demand and in such a manner that the flow of solids from the Primary Injector is not interrupted or changed by reason of the refilling operation, and during which time as well as during times when the filling operation is not taking place the weight rate of material being fed is being measured and controlled by novel means. Said means incorporates the use of load cell systems utilizing weight measurement cells mounted within the structural support systems for the injector vessels and electronic devices as hereinafter described.

Two optional electronic control systems may be utilized for the automatic control of the feed rate of solids flowing from the Primary Injector. In both such optional methods the load cell system produces a millivolt electrical signal which decreases in proportion to the weight of material in the Primary Injector vessel. In optional Method A, in addition to the millivolt signal from the load cell system, an electronic device referred to as a ramp generator produces an electronic signal proportional to the desired weight rate of solids flow from the Primary Injector of the feed system. This signal is continuously and automatically compared to the electric signal from the load cell system. If there is a deviation in the two values, the pressure in the Primary Injector is automatically changed to adjust the feed rate by employing the feeding system process control features explained herein. In optional Method B, the loss-in-weight signals from the load cell system is converted to a rate signal by a microprocessor. An adjustable feed rate signal is generated by a supplemental microprocessor unit. This signal is compared to that generated from the load cell system and any deviation in the two values causes the feed rate to be adjusted as in optional Method A.

A manner of carrying the invention into effect will now be described with particular reference to the accompanying drawings wherein.

Figure 1:
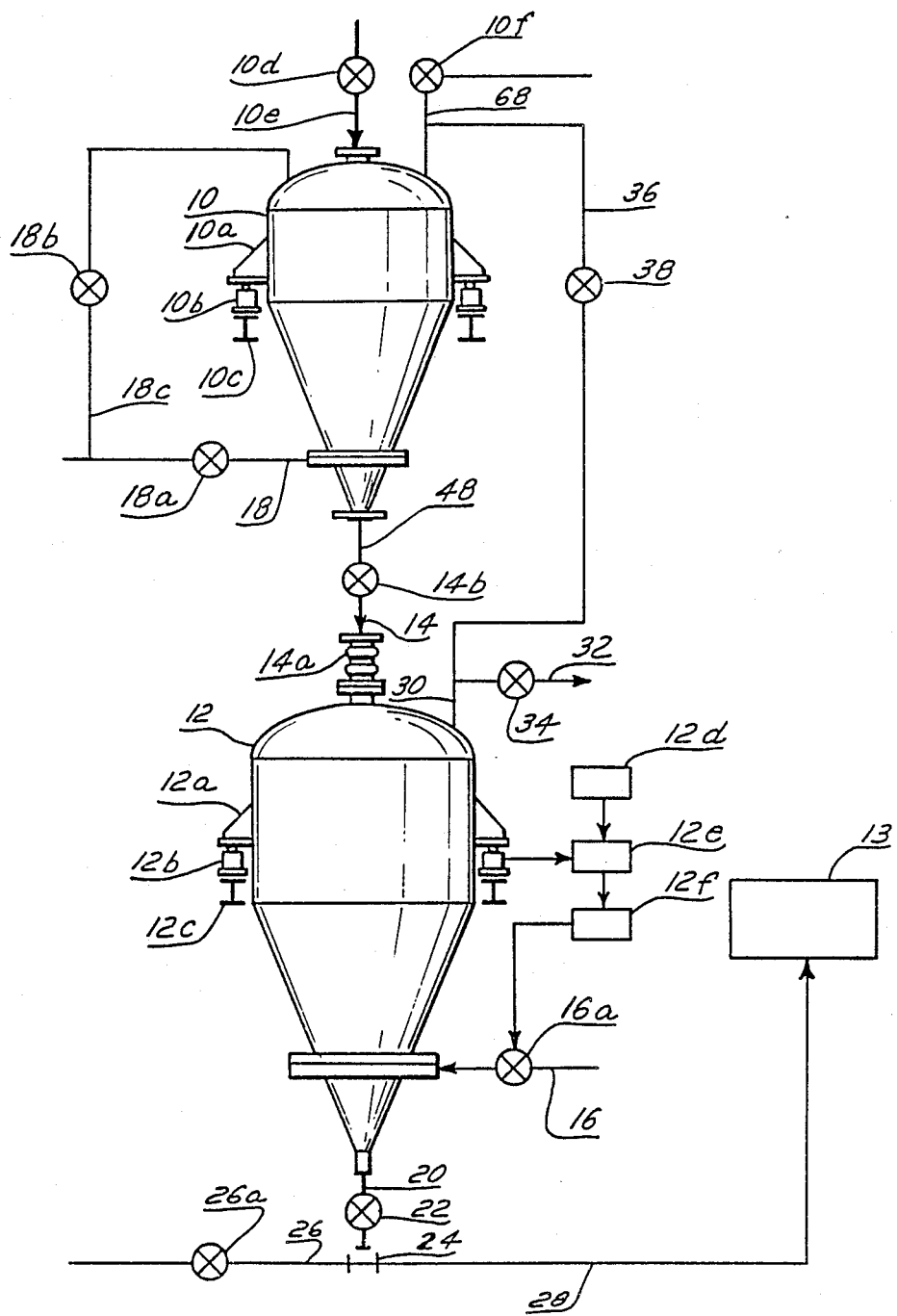
FIG. 1 is a flow diagram of the process of this invention amplified to show the general external shape and relative positioning of the principal apparatus elements.

In the flow diagram of FIG. 1, particulate solids of appropriate particle size for end use which have been charged through valve 10d are discharged from storage vessel 10 into Primary Injector 12 through valve 14b in conduit 14. A compatible gas is introduced into the lower zone of Primary Injector vessel 12 through pipe 16 and valve 16a and into Storage Injector 10 through pipe 18 by means of valve 18a or through pipe 18c by means of valve 18b in the manner hereinafter described. Discharge conduit 20 leads from the bottom of Injector vessel 12 through valve 22 into mixing unit 24 shown in detail in FIG. 5. Gas is supplied through gas flow control valve 26a to arm 26 of the mixing unit and the mixture of gas and solids is discharged from arm 28 of the unit into apparatus 13 which generally represents the process and/or equipment being supplied with material by means of the subject invention.

From the upper zone of injector vessel 12 a gas discharge conduit 30 leads to atmospheric discharge conduit 32 through valve 34 and to Storage Injector pressure equalization conduit 36 which is provided with a valve 38.

One important feature of the invention resides in the method of discharging the solids from the injector vessel 12 for entrainment in the conveying gas. Suitable apparatus therefor is shown in detail in FIG. 2. It will be noted that the configuration of the bottom of vessel 12 is conical and mounted centrally therewithin is double cone 40, the outer surface of the lower inverted cone of double cone 40 being roughly parallel to, and substantially spaced apart from, the wall 41 of the conical bottom of vessel 12. The spacing between double cone 40 and wall 41 is, of course, subject to considerable variation. Generally, the width of said annular passageway will vary from about 1 to 3 times the width of bottom opening 49. The apex of each of the cones of double cone 40 for best efficiency describes an angle of about 45° although some departure from this angularity in both directions is permissible between the limits of approximately 27° and 60°. This angle depends on the properties of the material being processed. In any case the angle of flare of the bottom vessel 12 must be roughly in accord with that of the apex of the inverted cone of double cone 40. It should also be noted that for some uses the inverted cone may be truncated.

Figure 2:
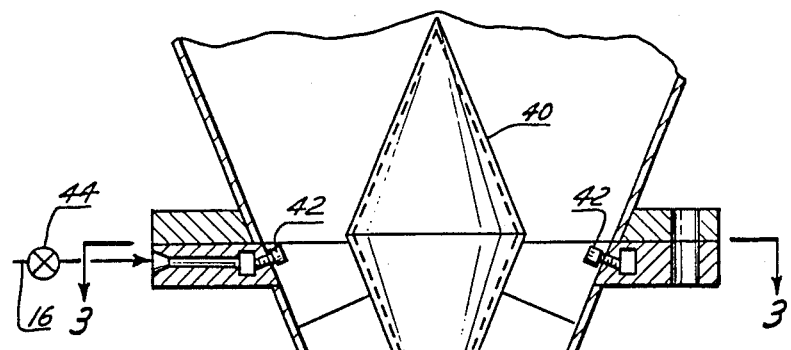
FIG. 2 is a side view partly in cross section of a discharge zone from the Primary Injector vessel and associated equipment.
Figure 3:
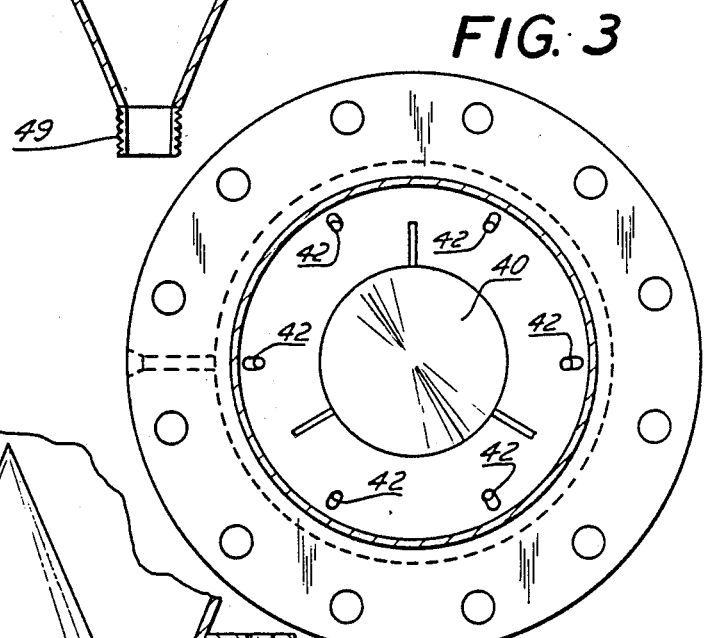
FIG. 3 is a plan view taken along line 3—3 of FIG. 2.

Extending through the conical wall 41 of the vessel bottom are gas injection nozzles 42 which preferably lie somewhat below the horizontal midsection or widest horizontal section of double cone 40 as shown in FIG. 2, or at said midsection, but may in some cases be slightly above said midsection. These nozzles 42 are supplied with gas from pipe 16, the flow thereto being controlled by valve 44. A suitable deployment of nozzles 42 is shown in the plan view of FIG. 3. Other spacing and positioning of the nozzles 42 may be used within the contemplation of this invention. For example the nozzles 42 may be mounted completely inside the wall 41 of vessel 12, such as on the inverted portion of double cone 40.

Figure 4:
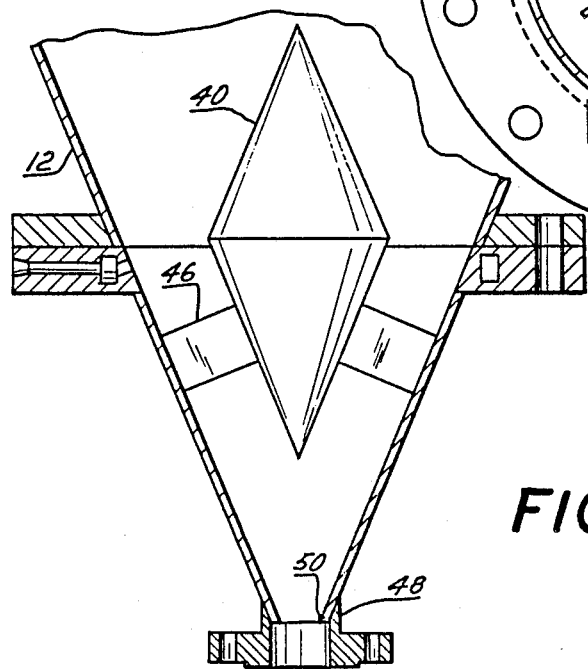
FIG. 4 is a side view partly in cross section of the discharge zone of the Storage Injector.

As has been indicated above, Storage Injector 10 may be constructed similarly to the Primary Injector 12 but preferably with approximately one-half its active volume; however, for simplicity, it is preferred to employ the construction illustrated in FIG. 4. The double cone 40, attached to the bottom wall by several spider flanges 46 (two shown), as, in fact, the double cone is attached to the bottom section of vessel 10 serves the same purpose as in vessel 12. However, the gas jets may be omitted when feeding free-flowing materials.

Figure 5:
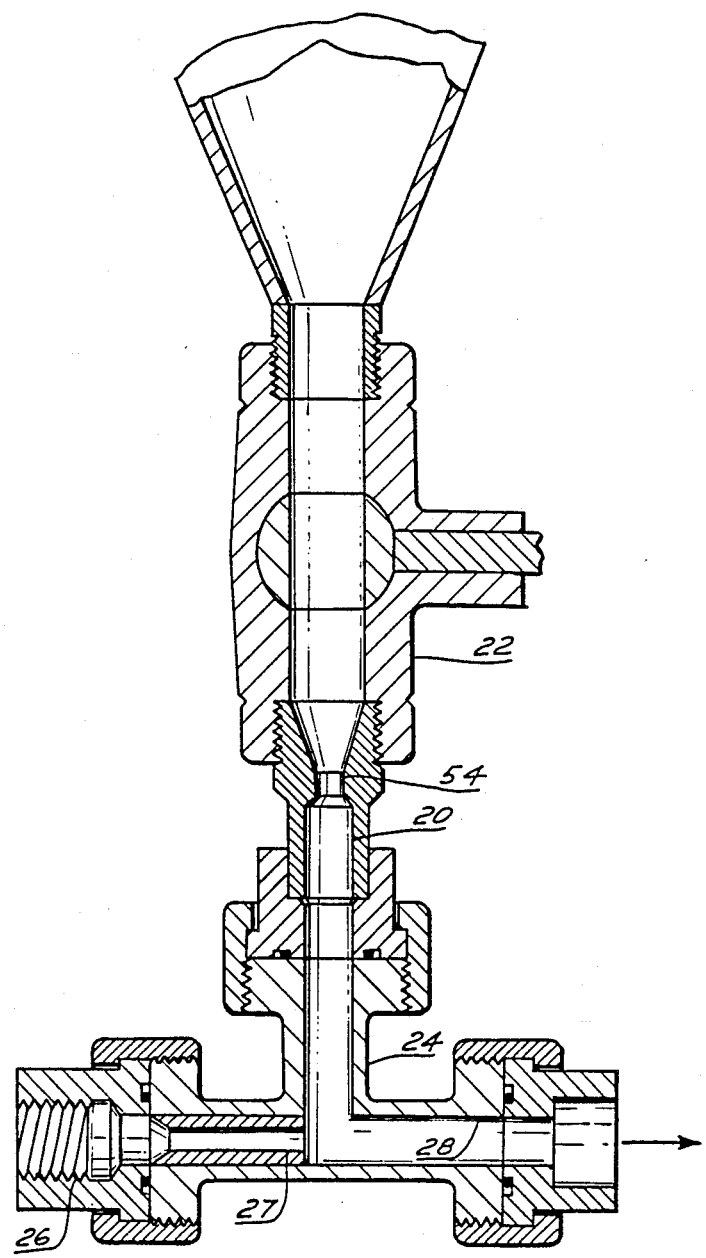
FIG. 5 is a sectional side view of the gas-solids mixing unit or T.

The mixing unit 24 in which the particulate solid is entrained in the conveying gas is shown in detail in FIG. 5. This is connected to conduit 20 below valve 22. The mixing unit is provided near the upper inlet end with an orifice 54, of frustoconical shape. Pipe 26 is the diluter gas inlet branch of the mixing unit, and pipe 28 is the outlet for the mixture of gas and particulate material. The inlet branch is equipped with an insert pipe 27 which has an inside diameter approximately one-half that of the outlet branch 28.

Flow diagram shown in FIG. 1 also shows additional critical elements consisting of vessel support lugs 10a and 12a; load cells 10b and 12b, and vessel supports 10c and 12c. Supports 10c and 12c must be integrated with an overall support structure have sufficient strength and rigidity that movement due to imposed operating loads can be accurately measured by means of load cells 10a and 12b and not influenced by external restraining forces. Expansion element 14a in line 14 is provided to permit unrestricted movement of vessel 12 due to the change in weight of the contents of the vessel.

Instrument 12d provides an electric signal which is proportional to the weight rate desired for the feeding system and which rate is adjustable. Instrument 12e continuously compares the output signal from the load cell system with the signal from element 12d and sends a modulating signal to instrument 12f which controls pressure regulator valve 16a.

Figure 6:
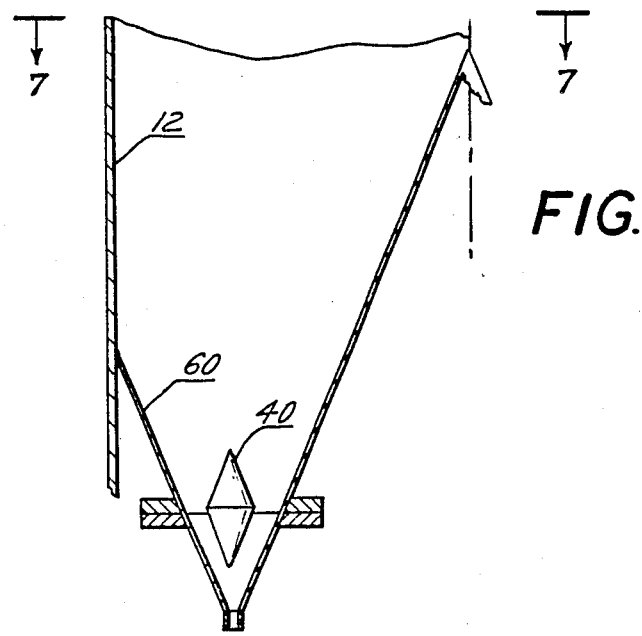
FIG. 6 is a side view in cross section of a single discharge outlet in a multi-outlet nest of a Primary Injector vessel having a total of eight (8) feed outlets.
Figure 7:
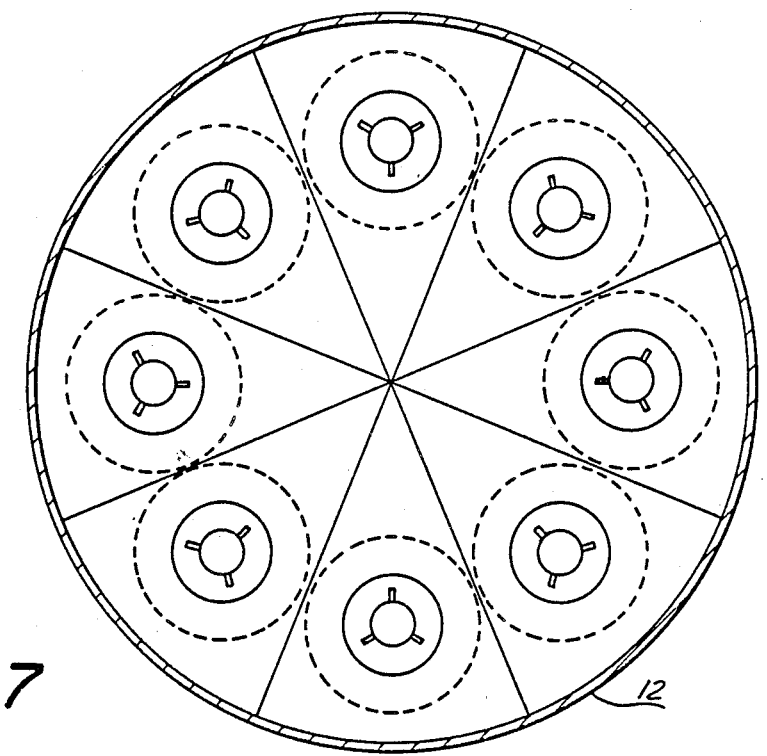
FIG. 7 is a plan view of the entire multi-outlet Primary Injector vessel taken on line 7—7 of FIG. 6.

Although the process of this invention can be carried out using the single cone injector vessel of FIG. 2, it is often desirable to employ an injector vessel having a plurality of conical discharge zones when the material must be delivered simultaneously to several points such as to the tuyeres of a blast furnace. Such multi-cone apparatus is illustrated by FIGS. 6 and 7, in which eight cones 60 are deployed around the bottom of a Primary Injector vessel in such a manner that there are no dead spaces within the vessel for the accumulation of materials being conveyed when all feed points being provided are in use.

The process is carried out in apparatus such as that described above in the following manner. Primary Injector vessel 12 is initially charged with particulate solid material to a level such that an electric signal transmitted by the load cell weigh system shows that said level is above a pre-established "low level" point. Fill valve 14b in line 14 is closed as is valve 38 in line 36. A flow of gas is controlled by valve 16a which automatically regulates the flow to establish the pressure in Primary Injector vessel at a predetermined value higher than in receiving vessel 13. Gas flow through line 26 is regulated by flow control valve 26a at a rate precalculated to result in a velocity, at operating pressure conditions, somewhat above that at which the solids being fed will settle in the pipe. Typically this velocity is between 30 and 40 feet per second at the position immediately downstream of mix-T 24. The flow of pressurizing gas to line 16 through diffuser nozzles 42 maintains the bed of solids in the lower section of vessel 12 in somewhat open condition but not in the state of agitation and suspension commonly encountered in fluidized beds. In other words a function of the inflowing gas is to lubricate flow of solids out of the vessel while maintaining the pressure at the level required to produce the desired flow rate of solids from the vessel. For convenience, this condition may be termed "fluffing". Without this particular form of conditioning, flow of most types of solids from a vessel, even under pressure, cannot be maintained at the precisely controlled, consistent rates required for the functions achieved by this invention.

After the gas flows are established, as previously described, and feed valve 22 is opened, the solid material flows under pressure from vessel 12 into the mixing unit 24 (see FIG. 5) for any given pressure in the vessel, the size of orifice 54 and the amount of gas flowing through 26 determines the rate of solids flow through pipe 28 for uses such as those hereinafter described.

Conduit 30 is connected by valve 38 into conduit 36 which equalizes the pressure in vessels 12 and 10 during replenishment of injector vessel 12 with solids from Storage Injector 10, the valve in conduit 14 being opened for the purpose, and the material flowing by gravity from one vessel to the other. The pressures in the vessel ordinarily being equal, although under some conditions, e.g., when transferring materials having poor flow properties, the pressure may be higher in vessel 10 than in vessel 12. In that case valve 38 will remain closed until after valve 14b is substantially open and at which time a controlled volume of "fluffing" gas is admitted to vessel 10 through line 18 by means of valve 18a and distributed by diffuser nozzles as in vessel 12.

Storage Injector vessel 10 is supported so that its weight will not interact with vessel 12, and a load, cell system with a suitable number of load cells 10b, normally three or four are provided. This weigh system has multiple uses, including (a) to determine the correct weight of material used for filling the vessel 10 through valve 10d in line 10e during which time the vessel is at atmospheric pressure and valve 10f in line 68 is open; (b) to provide an accurate batch weight measurement of material being cyclically charged into the continuously feeding Primary Injector vessel 12; and (c) to integrate its weighing signal with the signals from the Primary Injector load cell system at the appropriate time. That integrating feature of the system permits control of the rate of material being discharged from the Primary Injector during the time material is being transferred from vessel 10 to vessel 12. Otherwise, those periods of time would be disruptive to the automatic control of the feeding system. It should be understood that all of the valve functions referred to herein are preferably caused to open or close by means of pneumatic operators and that the operating cycle is dictated by a cycle logic system which utilizes conventional mechanical-electric relays or a programmable controller coupled with either analog or digital control instruments. A further option is to perform all of the control functions with a suitably programmed microprocessor.

While this invention is valuable because of its characteristic of operating at high solids-to-gas ratios, the invention has great value in many pneumatic transport applications requiring a controlled solids feed rate. Not only is the process unique in its ability to control solids flow rates precisely, but it is also applicable at solids flow rates as low as one pound a minute into a gas stream of any quantity. In such cases the solids-to-gas weight ratio is determined by process requirements rather than energy requirements for the transport system. Of even greater value is the fact that the invention can be utilized for feeding large weights of materials into processes, e.g., in coal gasification processes a single feed system can readily accommodate feed rates of 150 tons per hour of prepared coal and can accurately sub-divide this into many controlled streams as required by the process designer.

The amount of gas flowing through the material in vessel 12 and into the discharge pipe 20 relative to that entering at the mixing unit will depend on the material being conveyed. Using comparatively large, uniform sized material, the flow of conveying gas through the vessel will be appreciable at high vessel pressures and may approach 100% of the total conveying gas. With a finely divided material, there may be little flow of gas through the material in vessel 12. Regardless of the amount of gas flowing through the vessel, a satisfactory conveyance of a given material is made possible by proper selection of the vessel pressure, the solids-to-gas ratio, the size of the conduits in the mixing unit, the size of the pipe line required to move the desired amount of material, and the amount of gas used to supplement that flowing with the solids discharging from the vessel. Generally, the higher the pressure inside the Primary Injector, the higher the flow rate of solids—everything else being equal. However, the volume of supplemental gas (gas entering the mixing unit through pipe 26) results in an inverse relationship with respect to the amount of solids injected at any given and constant vessel pressure. This combination of direct proportionality with vessel pressure and inverse proportionality with diluter gas provides a flexible means for control of the solids flow rate which is particularly useful when using multiple feed points requiring the same or varying solids flow rates among the multiple lines.

In the illustrative embodiment, the preferred range of particle sizes of the material to be conveyed is minus $\frac{1}{4}$", with a relatively uniform weight percentage on each of the intermediate screens; in other words, a normal aggregate distribution such as is obtained when breaking coal. Under certain conditions, however, an aggregate up to $\frac{1}{2}$" in size can be handled. It is possible to convey certain aggregates containing as much as approximately 90% by weight of minus 200 mesh particles, provided somewhat more "fluffing gas" is permitted to enter the vessel through nozzles 42 and vented by means of valve 34 through line 32. However, such fines should not be so small or of such a nature that they agglomerate. Since the velocities are low in the normal practice of this invention, size degradation of the particles is minimized in contrast to the attrition of particles normally occurring in regular pneumatic conveying systems.

The process of this invention is particularly useful for the injection of dry, pulverized coal into the tuyeres of a blast furnace. It appears possible thereby to replace up to at least 30% of the weight of coke normally used in the charge to the blast furnace, which will greatly improve the economics of iron and steel production. Many modern blast furnaces utilize liquid or gaseous hydrocarbons as auxiliary fuels for replacement of part of the charge coke. However, the increasing cost and reduced supply of these materials make the present invention particularly important. Furthermore substantially more coke can be replaced when injecting dry coal than when injecting liquid or gaseous fuels.

A typical application of the process and apparatus of this invention is as follows:

A Primary Injector vessel having a storage capacity of 25 tons of prepared coal is located approximately 200 feet from a blast furnace. The Primary Injector vessel is equipped with twenty-five (25) outlets, each having the needed associated equipment including a mixing unit. Each mixing unit is connected to a ¾" nominal pipe size line, which, in turn, is connected to an alloy steel or water cooled lance mounted so as to feed into a blast furnace.

The Primary Injector is filled automatically, on low level demand signal, from a pressurized storage vessel located immediately above. The pressure in the Primary Injector is approximately thirty-five pounds above the pressure in the tuyeres, which is approximately forty pounds gauge pressure during blast. The pressure of the blast-air is somewhat variable which would result in a variable rate of flow of injection coal except that one of the novel features of the feeding process automatically adjusts the pressure in the injection vessel to maintain the coal rate desired by the operator who "sets" the desired rate on the instrument control panel. Likewise all gas flows are automatically maintained from the master control panel within which the valve sequencing logic is also controlled to provide continuous and automatic operation. A typical rate of coal injection is approximately twenty pounds per minute in each of the twenty-five tuyeres at a solids-to-air weight ratio of approximately 10:1.

Another example of the use of this feeding process involves the injection of comminuted, dry coke breeze into the tuyeres of an iron melting cupola. In most large iron foundries such as those owned by automobile manufacturers, iron for castings is melted in cupolas into which heated air is blasted into the furnace through multiple tuyeres near the base of the furnace. Charge material may consist of scrap steel, iron, steel and iron briquettes and the like, and screened foundry coke. In the pre-screening of coke before use in the cupola large amounts of breeze (approximately minus 1 inch) are accumulated which has relatively low sales value. When this relatively inexpensive coke breeze is prepared to a size of approximately minus 10 mesh and dried, its cost is of the order of one-third that of charge coke. Such material can be used by the process of this invention to replace from about 10% to 20% of the coke charged, with substitution ratios of from about 1.0 to 2.0 pounds of coke removed per pound of coke fines injected, with a substantial saving in cost of production.

A specific example of the use of the process of this invention for the injection of coke fines through the tuyeres of an iron producing cupola is as follows: A 122" diameter cupola operating with 25,000–27,000 SCFM blast air at 1200° F. has ten tuyeres, five of which were equipped for coke injection. This cupola was melting 50 to 60 tons per hour of 37% returns, 55% iron and steel briquettes, and 8% steel bundles. The Primary Coke Injector was constructed in accordance with this invention except that cupola operation does not require the rate control instrumentation on an absolutely continuous basis since the operator monitors the feed rate to the cupola by observing the iron melting process and chemistry of the iron product. This permits the interruption of the feed rate measurement system for short periods during replenishing of the supply of coke injected which in this case was provided by a Feed Injector. In the operation described in this example the injector supplied coke fines at the rate of 18 pounds per minute evenly distributed in five injection lines and the average replacement of charge coke was 1.3 pounds per 1.0 pound of injected breeze with an overall saving of 13% of the charge coke.

We claim:

1. Apparatus for effecting pneumatic conveyance of particulate solids comprising:
   (a) container means having a lower part which comprises an inverted conical section,
   (b) a double cone baffle mounted centrally within said container means composed of two cones each of which is smaller than said conical section and which are joined base to base and with an axis common to that of said container means with the wall of the lower cone of said double cone baffle being substantially parallel to the coextensive wall of said inverted conical section and forming an annular space therebetween,
   (c) said container means having a solids charging inlet near its top and being adapted to hold gases at elevated pressures,
   (d) means for introducing a gas into said annular space,
   (e) means for controlling the pressure in said container means,
   (f) means forming a mixing chamber under said container means with an inlet passageway connecting the bottom of said inverted conical section with the top of said mixing chamber, and said mixing chamber having a discharge passageway,
   (g) means for supplying a controllable amount of gas to one side of said mixing chamber,
   (h) a conduit system,
   (i) means to conduct particulate solids pneumatically out of said discharge passageway of said mixing chamber and to said conduit system,
   (j) supply means for supplying a predetermined amount of particulate solids to the upper zone of said container means during the period when said particulate solids are flowing from said mixing chamber into said conduit system without substantially influencing the pressure in said container means,
   (k) means for controlled venting of gas from said container means during the periods when said supply means is supplying solid material to said container, and
   (l) means for measuring the weight rate of solid material flowing from said container, including load cell means for generating a first signal decreasing in proportion to the weight of material measured by the load cell means;

(m) means for generating a second signal proportional to the desired weight rate of solid material flow from said container;

(n) means for comparing said first and second signals and determining the deviation therebetween; and (o) said means for controlling pressure in said container means being responsive to the deviation between said first and second signals to produce a continuous flow of said particulate solids to said mixing chamber even during the period when said particulate solids are being supplied to the upper zone of said container means.

2. The apparatus of claim 1 wherein said container is constructed with a plurality of said inverted conical sections such that there is no dead space above said conical sections and each of which inverted conical section is supplied with gas and connected to said mixing chamber.

3. A system for feeding controlled amounts of particulate carbonaceous material typified by dry coke breeze having a particle size less than 2000 microns to an iron melting cupola utilizing the apparatus of claim 2.

4. A system for feeding controlled amounts of dried particulate coal or limestone or other desirable solids to a blast furnace utilizing the apparatus of claim 1.

5. Apparatus for effecting pneumatic conveyance of particulate solid materials comprising:

(a) a container, the lower part of which comprises at least one inverted conical section having mounted centrally therewithin a double cone baffle composed of two cones joined base to base and arranged so that the walls of the lower cone of said double cone baffles are substantially parallel to the walls of said inverted conical section, (b) a solids charging inlet near the top of said container, said inlet being provided with means for withholding internal pressure, (c) means for introducing and distributing a gas into the annular space between said lower cone and said inverted conical section, (d) means for controlling the pressure in said container, (e) a mixing chamber under said container with a passageway connecting the bottom of the inverted conical section of said container with the top of said mixing chamber, (f) means for supplying a controllable amount of gas to one side of said mixing chamber, (g) means to conduct material pneumatically out of said mixing chamber, (h) means for supplying a predetermined amount of particulate solid material to the upper zone of said container during the period when said solid material is flowing from the mixing chamber into a conduit system, (i) means for controlled venting of gas from said container during the period when said means (h) is supplying solid material to the container, (j) means for measuring and continuously controlling the weight rate of solid material flowing from the container including load cell means for generating a first signal decreasing in proportion to he weight of material measured by the load cell means, means for generating a second signal proportional to the desired weight rate of solid material flow from said container, means comparing said first and second signals and determining the deviation therebetween; and means for controlling the pressure in said container in response to the deviation between said and first and second signals to assure a continuous controlled flow of particulate solids from the container to the mixing chamber even when particulate matter is being supplied to said container.

6. Apparatus as described in either of claims 1 or 5 which includes supply means positioned at a higher level than said container means and adapted to store a body of said particulate solids, and means for delivering particulate solids from said supply means to said container means.

* * * * *